(12) United States Patent
Raatschen et al.

(10) Patent No.: US 8,951,928 B2
(45) Date of Patent: Feb. 10, 2015

(54) METHOD FOR REGENERATING AN ADSORBER OR ABSORBER

(75) Inventors: Willigert Raatschen, Immenstaad (DE); Lutz Schauer, Friedrichshafen (DE); Helmut Westermann, Markdorf (DE); Carsten Matthias, Friedrichshafen (DE)

(73) Assignee: Astrium GmbH, Taufkirchen (DE)

( * ) Notice: Subject to any disclaimer, the term of this patent is extended or adjusted under 35 U.S.C. 154(b) by 473 days.

(21) Appl. No.: 13/159,999

(22) Filed: Jun. 14, 2011

(65) Prior Publication Data
US 2012/0004092 A1 Jan. 5, 2012

(30) Foreign Application Priority Data
Jun. 15, 2010 (EP) .................................... 10006168

(51) Int. Cl.
*B01J 38/02* (2006.01)
*B01J 38/04* (2006.01)
*B01J 38/00* (2006.01)
(Continued)

(52) U.S. Cl.
CPC .......... *B01D 53/1425* (2013.01); *B01D 53/04* (2013.01); *B01J 20/18* (2013.01); *B01J 20/22* (2013.01); *B01J 20/3408* (2013.01); *B01J 20/3425* (2013.01); *B01J 20/3466* (2013.01); *B01J 20/3483* (2013.01); *B63G 8/36* (2013.01); *B01D 2253/108* (2013.01); *B01D 2253/20* (2013.01); *B01D 2253/206* (2013.01); *B01D 2257/504* (2013.01); *B01D 2257/708* (2013.01);
(Continued)

(58) Field of Classification Search
CPC ............... B01D 53/1425; B01D 53/04; B01D 2253/108; B01D 2253/20; B01D 2253/206; B01D 2257/504; B01D 2257/708; B01D 2259/4009; B01D 2259/4566; B01J 20/18; B01J 20/22; B01J 20/3408; B01J 20/3425; B01J 20/3466; B01J 20/3483; B63G 8/36; Y02C 10/08
USPC ...................................................... 502/20–56
See application file for complete search history.

(56) References Cited

U.S. PATENT DOCUMENTS

| | | | |
|---|---|---|---|
| 7,947,239 B2 * | 5/2011 | Lackner et al. | 423/220 |
| 2003/0167993 A1 * | 9/2003 | Husain et al. | 114/74 R |
| 2012/0004092 A1 * | 1/2012 | Raatschen et al. | 502/55 |

FOREIGN PATENT DOCUMENTS

| | | |
|---|---|---|
| DE | 690 02 112 T2 | 1/1994 |
| DE | 198 30 470 C1 | 11/1999 |

(Continued)

OTHER PUBLICATIONS

English Translation of DE 10 2006 048 716 B3, Feb. 21, 2008.*
(Continued)

*Primary Examiner* — Jennifer A Smith
(74) *Attorney, Agent, or Firm* — Crowell & Moring LLP

(57) ABSTRACT

A method for regenerating an adsorber or absorber on board a submarine, wherein the adsorber or absorber is present in the interior of the submarine for binding metabolically generated $CO_2$-containing harmful gases, and wherein the metabolically generated $CO_2$-containing harmful gases are transferred outboard via a compressor. The thermal energy for regenerating the adsorber or absorber is generated by burning a hydrocarbonaceous energy carrier with oxygen, wherein at least one combustion product, together with the metabolically generated $CO_2$-containing harmful gases, is transferred outboard via the compressor.

9 Claims, 3 Drawing Sheets

(51) Int. Cl.
  *B01D 53/14* (2006.01)
  *B01D 53/04* (2006.01)
  *B01J 20/18* (2006.01)
  *B01J 20/22* (2006.01)
  *B01J 20/34* (2006.01)
  *B63G 8/36* (2006.01)
(52) U.S. Cl.
  CPC . *B01D 2259/4009* (2013.01); *B01D 2259/4566* (2013.01); *Y02C 10/08* (2013.01)
  USPC .................................. 502/56; 502/34; 502/20

(56) References Cited

FOREIGN PATENT DOCUMENTS

| | | | |
|---|---|---|---|
| DE | 10 2006 048 716 B3 | 2/2008 | |
| FR | 2 552 160 A1 | 3/1985 | |
| JP | 04118046 A * | 4/1992 | ............... B01J 19/00 |

OTHER PUBLICATIONS

European Search Report dated Nov. 25, 2010 with partial English translation, (12 pages).

First European Office Action dated Feb. 8, 2012 with partial English translation (6 pages).

Second European Office Action dated Sep. 20, 2012 with partial English translation (3 pages).
Malaysian Office Action dated Jun. 14, 2013 in English (3 pages).

* cited by examiner

METHOD FOR REGENERATING AN ADSORBER OR ABSORBER

CROSS REFERENCE TO RELATED APPLICATIONS

This application which claims priority under 35 U.S.C. §119 to European Patent Application No. 10 006 168.8-2113, filed Jun. 15, 2010, the entire disclosure of which is herein expressly incorporated by reference.

BACKGROUND AND SUMMARY OF THE INVENTION

The invention relates to a method for regenerating an adsorber or absorber on board a submarine.

Submarines are generally equipped with solid or liquid adsorbers or absorbers in order to bind harmful gases from the cabin air. Harmful gases in this case can be metabolic products given off by people to the cabin air, outgassing products of materials and processes, and also leaks from units.

In the case of the metabolic products, the binding of expired $CO_2$ is of most importance quantitatively. In addition, numerous volatile organic compounds (VOCs) are emitted not only by people but also by materials and processes.

Whereas for submarines having short submerge times, frequently non-reversible binding concepts are used such as, e.g., lithium hydroxide or soda lime for binding $CO_2$ and activated carbon for binding VOCs, in the case of submarines that are submerged for relatively long periods such as nuclear-propelled submarines or air independent propulsion (AIP) submarines, regenerative binding methods are used. Because binder is thereby saved, the space requirement for storing the binder is decreased. This advantage, however, increases the energy requirement necessary for regeneration. In nuclear-propelled submarines, this is not usually a problem. In the case of AIP submarines, however, electrical energy for regenerating systems binding harmful gases is available only to a very limited degree.

Regenerative binding methods require electrical energy, e.g. for a fan, a gas compressor for transferring harmful gases outboard, or for control elements. Frequently, energy is also required for heating the ad/absorbents or for generating steam for the regeneration. This can be electrical energy or thermal energy.

Submarines having AIP drive designs, in which waste heat is produced at the required level and can be utilized, such as, e.g., in the case of submarines having a Stirling engine, closed diesel engine or reformer for fuel cells, are advantageous here for generating heat or steam.

In submarines having fuel cells and $H_2/O_2$ as fuel, customarily a reformer is not required and the waste heat of the fuel cell is at too low a level to be able to be used expediently. For such submarines, therefore, new designs are required in order that the requirement for thermal energy can be covered.

German Patent document DE 10 2006 048 716 B3 discloses a method in which $H_2$ and $O_2$, which are already present on board for operating the fuel cells, are burnt in order, utilizing the heat of the reaction, to generate steam from liquid water for the process of regenerating $CO_2$ binding systems. A further variant also provides utilization of the steam resulting from the reaction of $H_2$ and $O_2$ for the regeneration. In this reaction, no further exhaust gas components such as, e.g., $CO_2$ or CO are formed.

However, this known process requires large tanks to store the hydrogen. Usually, for this purpose, metal hydride stores are used in which the loading density is less than 3% by weight.

German Patent document DE 690 02 112 T2 and French Patent document FR 2 552 160 A1 each disclose thermal steam engines for use in a submarine in which the water used as working medium is converted into superheated steam from the combustion of a hydrocarbonaceous energy carrier with oxygen in a Stirling-Hirn cycle process. In German Patent document DE 690 02 112 T2, the $CO_2$ formed in the combustion is stored in cylinders arranged on the outside of the stern of the submarine and which originally contained the oxygen required for the combustion. In French Patent document FR 2 552 160 A1, the $CO_2$ formed is transferred outboard using a compressor.

It is therefore the object of the invention to provide a method for regenerating adsorbers/absorbers loaded with metabolic $CO_2$ on board submarines, in which the storage volume of the energy carrier necessary for the regeneration can be considerably decreased.

According to the invention, for generating thermal energy, a hydrocarbonaceous, generally liquid, energy carrier is used such as, e.g., ethanol, methanol, propane, butane etc., for the combustion with $O_2$.

The gases formed in the combustion of these energy carriers, in addition to steam, are transferred outboard according to the invention using a compressor. Since, for the regenerative $CO_2$ binding system for removing the metabolic $CO_2$, generally a $CO_2$ compressor is already present on board, this compressor can advantageously also be used for transferring exhaust gases outboard.

In order to keep the amount of exhaust gas for the compressor as small as possible, an exhaust gas cooler with condensate separation can be connected upstream.

In principle, the thermal energy generated by the combustion can be used in two different ways for the regeneration:

1. The heat of combustion can be utilized for vaporizing water. The steam thus produced is utilized for regenerating the adsorbers or absorbers.

A special use thereof is regeneration processes, in which saturated or superheated steam between 80-150° C. is required for expelling the harmful gases from the adsorber, such as, e.g., in the regeneration of $CO_2$ adsorbers based on solid amine or the regeneration of zeolite beds after the binding of metabolic $CO_2$. Further suitable adsorbers are ion-exchange resins or solid amines for $CO_2$ binding, in particular those described in German Patent document DE 198 30 470 C1 which is herein incorporated by reference. Furthermore, the adsorber can contain a zeolite for binding VOCs or a Freon, in particular R134a. All of the adsorbers mentioned here are also suitable for regeneration by energy input (see hereinafter 2).

Only the liquid water vaporized by the heat of combustion is used for the regeneration, whereas the combustion products ($CO_2$, $H_2O$ and any further by-products) are conducted separately therefrom, bypassing adsorber and absorber, to the compressor, where they are disposed of outboard.

2. The heat of combustion can also be used directly, i.e. without intermediate connection of a water vaporization, for regenerating the adsorbers or absorbers. Here, in particular absorbers can be used in the form of a liquid amine, e.g. monoethanolamine MEA.

The invention has the advantage that the hydrocarbonaceous energy carriers are stored at a higher loading density and energy density, which results in a markedly lower storage volume than in the known $H_2/O_2$ combustion method.

The invention is suitable, in particular, for use in submarines having AIP drive designs, e.g. those based on fuel cells.

Other objects, advantages and novel features of the present invention will become apparent from the following detailed description of one or more preferred embodiments when considered in conjunction with the accompanying drawings.

BRIEF DESCRIPTION OF THE DRAWINGS

The invention will be described with reference to specific exemplary embodiments. In the drawings.

DETAILED DESCRIPTION OF THE DRAWINGS

Figure 1:
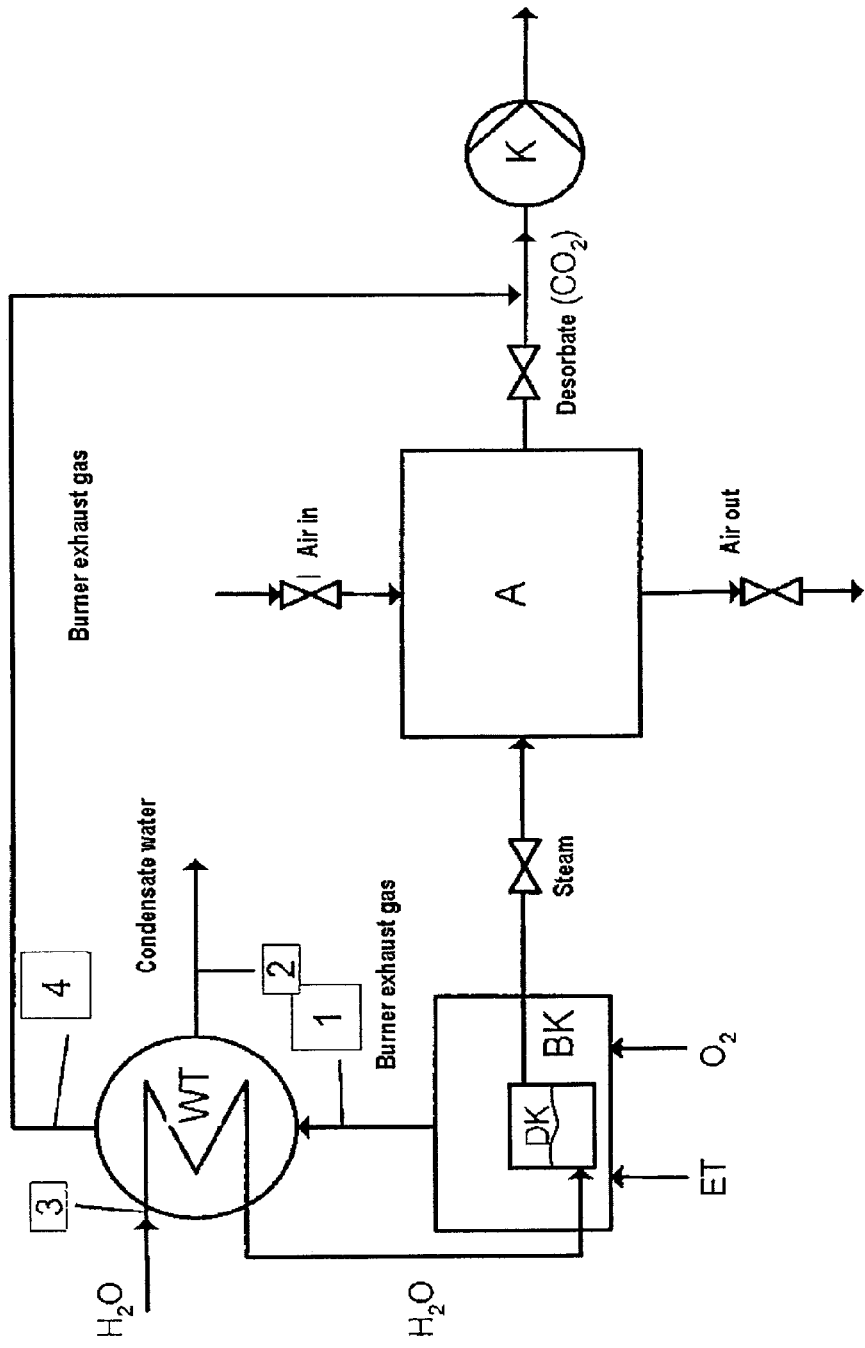
FIG. 1 shows a first embodiment of the method according to the invention, wherein the regeneration proceeds using steam.

FIG. 1 shows a first embodiment of the process according to the invention, wherein the regeneration of the adsorber or absorber proceeds using steam.

The steam is generated in a combustion chamber BK, within which there is situated a steam kettle DK containing liquid water. The water is fed from the outside via the line 3. The energy carrier ET which is frequently present in liquid form during storage is expanded or gasified before it flows into the combustion chamber BK. Oxygen $O_2$ is likewise introduced into the combustion chamber BK. The steam kettle DK can also be situated outside the combustion chamber BK.

The heat formed in the combustion reaction is fed to the steam kettle DK in which the liquid water is vaporized. The resultant steam is passed to the ad/absorber bed A for regeneration thereof. The desorbate, substantially metabolic $CO_2$, is fed to a compressor K, via which it is removed outboard.

The combustion products, consisting of $CO_2$, $H_2O$ and possibly other by-products, leave the combustion chamber BK via line 1 and flow into a gas/water heat exchanger WT, which cools the exhaust gases and in the course of this preheats, in line 3, the water that is to be vaporized. The water vaporization can therefore be achieved using condensing-boiler technology. The condensate that arises from the burner exhaust gases is removed via line 2. The burner exhaust gases, reduced by the precipitated condensate, leave the gas/water heat exchanger WT via line 4 and are removed outboard by the same compressor K with which the desorbate (metabolic $CO_2$) is brought outboard.

Figure 2:
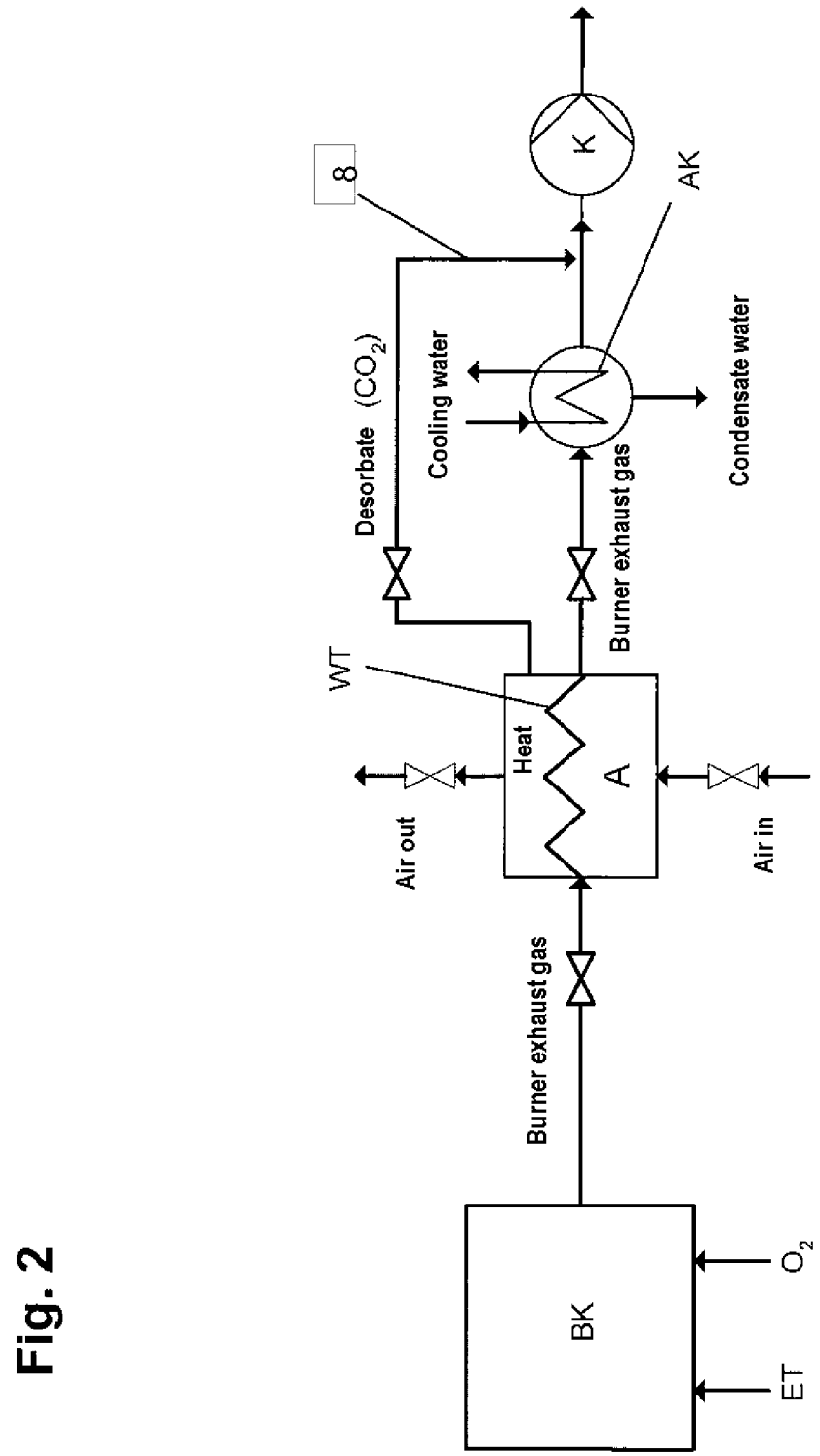
FIG. 2 shows a further embodiment of the method according to the invention, wherein the regeneration proceeds by means of direct heat coupling into a solid adsorber.

FIG. 2 shows a further embodiment of the process according to the invention. In this embodiment, the energy being liberated in the combustion in the combustion chamber BK is utilized directly for regenerating the ad/absorber A. Therefore, generating steam for the regeneration is not required in this embodiment. This ad/absorber is, for example, a solid. The combustion exhaust gases are fed to a heat exchanger WT, via which the heat is coupled into the ad/absorber A. The combustion gases leaving the heat exchanger WT are, as in the previous FIG. 1, removed outboard via the compressor K after passing through an exhaust gas cooler AK with condensate separation together with the metabolic $CO_2$ desorbate (from line 8).

Combustion chamber BK and the ab/adsorber unit A with integrated heat exchanger WT can either be constructed separately from one another or can be constructed in one component.

Figure 3:
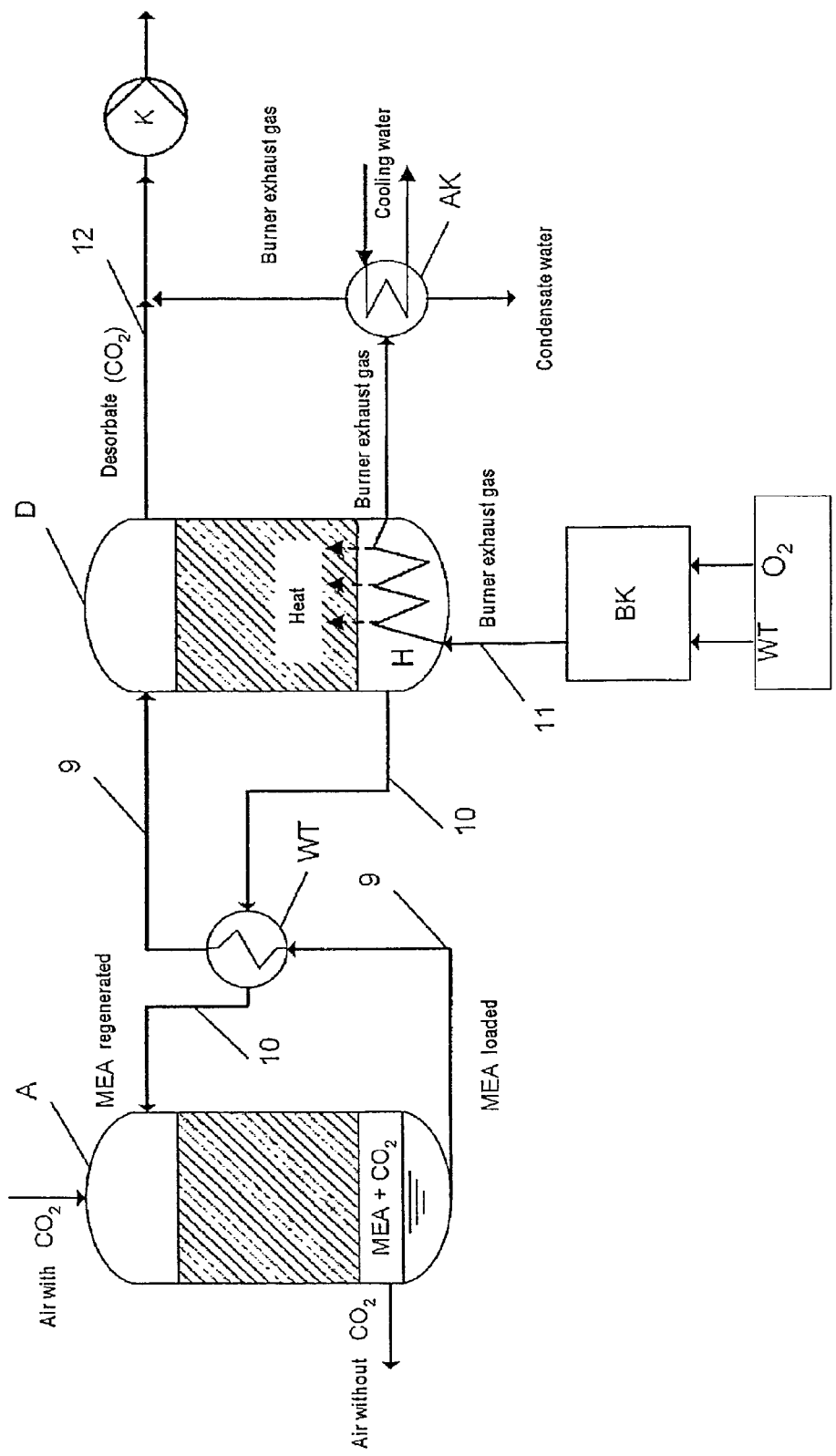
FIG. 3 shows a further embodiment of the method according to the invention, wherein the regeneration proceeds by direct heat coupling into a liquid absorber.

FIG. 3 shows a further embodiment of the process according to the invention which is used for systems having liquid amines (monoethanolamine, MEA) as absorber for metabolic $CO_2$. The liquid, $CO_2$-loaded absorber MEA, for regeneration, is passed from the absorber unit A via the line 9 into the desorber unit D and after regeneration has been performed, via the line 10 back into the absorber unit A. The warm absorber fluid leaving the desorber unit D again can be used, via a heat exchanger WT, for preheating the absorber fluid to be passed to the desorber unit D.

As in the embodiment according to FIG. 2, in the embodiment according to FIG. 3, the energy being liberated in the combustion in the combustion chamber BK is utilized directly, i.e. without intermediate connection of a vaporization of water, for regenerating the absorber situated in the desorber unit D. For this purpose, a heater H is integrated into the desorber unit D, via which heater the heat from the combustion is fed to the absorber medium which is to be regenerated. For this purpose, the combustion exhaust gases from the combustion chamber BK are passed via line 11 to the heater H.

The combustion gases leaving the heater H, after they pass through an exhaust gas cooler AK with condensate separation, are fed to the compressor K and are removed outboard together with the desorbate (from line 12).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method comprising:
generating thermal energy for regenerating an adsorber or absorber on board a submarine by burning a hydrocarbonaceous energy carrier with oxygen;
directly regenerating the adsorber or absorber using the generated thermal energy without using steam; and
transferring a combustion product, together with desorbate of metabolically generated $CO_2$-containing harmful gases, outboard via a compressor,
wherein the adsorber or absorber is present in an interior of the submarine for binding the metabolically generated $CO_2$-containing harmful gases.

2. The method according to claim 1, wherein the absorber is a liquid amine or a solid.

3. The method according to claim 2, wherein the liquid amine is monoethanolamine MEA.

4. The method according to claim 1, wherein an exhaust gas cooler with condensate separation is connected upstream of the compressor.

5. The method according to claim 1, wherein the adsorber is an ion-exchange resin or a solid amine for $CO_2$ binding.

6. The method according to claim 1, wherein the adsorber is a zeolite for binding VOCs or a Freon.

7. The method according to claim 6, wherein the Freon is R134a.

8. The method of claim 1, wherein the direct regeneration of the adsorber or absorber involves directly applying the generated thermal energy to a heat exchanger.

9. The method of claim 1, wherein the direct regeneration of the adsorber or absorber involves directly applying the generated thermal energy to a heater.

* * * * *